(12) United States Patent
Ackerly

(10) Patent No.: US 6,769,708 B2
(45) Date of Patent: Aug. 3, 2004

(54) DUAL MODE BICYCLE TRAINING AID

(76) Inventor: Jack Ackerly, 14706 S. Seminole Dr., Olathe, KS (US) 66062

( * ) Notice: Subject to any disclaimer, the term of this patent is extended or adjusted under 35 U.S.C. 154(b) by 28 days.

(21) Appl. No.: 10/215,889

(22) Filed: Aug. 9, 2002

(65) Prior Publication Data

US 2004/0026892 A1 Feb. 12, 2004

(51) Int. Cl.$^7$ ................................................ B62H 7/00
(52) U.S. Cl. .................. 280/295; 280/293; 280/298; 280/299; 280/300; 280/301; 280/302; 280/303
(58) Field of Search ................... 280/293, 295, 280/298, 299, 300, 301, 302, 303, 288.4

(56) References Cited

U.S. PATENT DOCUMENTS

| | | | | |
|---|---|---|---|---|
| 610,536 A | * | 9/1898 | Hipwood | 280/303 |
| 711,717 A | * | 10/1902 | Corneil | 280/303 |
| 1,371,736 A | * | 3/1921 | Christian | 280/303 |
| 2,509,937 A | * | 5/1950 | Olson | 280/303 |
| 4,917,398 A | | 4/1990 | de Miranda Pinto | 280/293 |
| 5,054,803 A | | 10/1991 | Ellingsen, Jr. | 280/301 |
| 5,133,569 A | | 7/1992 | Rieber et al. | 280/293 |
| 5,154,096 A | | 10/1992 | Geller et al. | 74/551.8 |
| 5,259,638 A | | 11/1993 | Krauss et al. | 280/293 |
| 5,338,204 A | | 8/1994 | Herndon | 434/247 |
| 5,577,750 A | | 11/1996 | Sklar | 280/293 |
| 5,683,093 A | * | 11/1997 | Hayes | 280/293 |
| 5,791,675 A | * | 8/1998 | Fleischer | 280/293 |
| 5,887,883 A | * | 3/1999 | Joules | 280/293 |
| 5,915,711 A | | 6/1999 | Seiple | 280/293 |
| 5,988,663 A | | 11/1999 | Starks | 280/293 |
| 6,120,050 A | | 9/2000 | Tillim | 280/293 |
| 6,164,666 A | * | 12/2000 | Prea | 280/7.15 |
| 6,244,612 B1 | | 6/2001 | Henderson | 280/293 |
| 6,286,849 B1 | | 9/2001 | Slattery | 280/301 |
| 6,474,670 B2 | * | 11/2002 | Shaw | 280/299 |
| 6,530,589 B1 | * | 3/2003 | Ma | 280/278 |
| 6,607,208 B2 | * | 8/2003 | Dartland | 280/292 |

* cited by examiner

Primary Examiner—Lesley D. Morris
Assistant Examiner—Daniel Yeagley
(74) Attorney, Agent, or Firm—Thompson Coburn LLP

(57) ABSTRACT

The invention is a training aid which can be converted from training wheels to a support bar which allows a person to learn the skills necessary to operate the bicycle. The invention allows a rider to be stabilized by the ground in a first position and to allow a non-rider to stabilize the bicycle in a second position.

18 Claims, 4 Drawing Sheets

DUAL MODE BICYCLE TRAINING AID

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of the Invention

The present invention relates to a land vehicle and more particularly a bicycle. Specifically, the invention provides a training aid which can be converted from training wheels to a support bar which allows a person to learn the skills necessary to operate the bicycle. The invention allows a rider to be stabilized by the ground in a first position and a non-rider trainer to stabilize the bicycle in a second position.

2. Related Art

Many children learn to ride a bicycle with the assistance of an older family member or a trainer. The learning process comprises two stages. In the first stage the rider learns to balance on a stationary bicycle, steer the bicycle, and operate the pedals. In the second stage the rider learns to maintain balance while moving.

Numerous devices teach a rider in the first stage. A set of training wheels provides the most common example of a first stage learning device. U.S. Pat. No. 5,133,569 discloses a training wheel assembly that allows the training wheels to be moved closer to the rear wheel of the bicycle. U.S. Pat. No. 5,054,803 discloses a set of training wheels which can be set at various levels above the ground requiring progressive tilting of the bicycle to engage the training wheels. U.S. Pat. No. 6,286,849 discloses a set of deployable training wheels. The rider begins moving after placing the training wheels in contact with the ground. Then the wheels move up and away from the ground.

Numerous devices assist in the second stage of learning to ride a bicycle, such as the handle devices. Once the training wheels have been removed, the rider must learn to balance the bicycle while in motion, including turning and coming to a stop. A trainer provides support by holding the bicycle seat allowing the rider to learn balance. U.S. Pat. No. 4,917,398 discloses a handle pivoted about the rear axle of the bicycle. This handle adjusts to a desired height. U.S. Pat. Nos. 5,259,638; 5,577,750; 5,683,093; 5,915,711; 5,988,663 and 6,120,050 demonstrate variations of this same device. U.S. Pat. No. 5,154,096 shows a similar device but also provides a brake on the handle. U.S. Pat. No. 6,244,612 discloses a handle which can be selectively positioned about the bicycle.

U.S. Pat. No. 5,338,204 discloses one of the only devices providing an aid useful for learning both stages of riding a bicycle. Deployed training move off the ground as desired, and a trainer provides support using a handle. In FIG. 3 the training wheels have been removed and the handle remains. The device attaches to the bicycle at the rear axle and does not have the ability to deploy only one training wheel if desired (i.e., when the rider consistently loses balance to a specific side). In addition, this device uses separate elements for the handle and the training wheel supports.

There exists a need for a device which can be utilized for both stages of learning to ride a bicycle. There also exists a need for a device which can be adjusted in multiple configurations as the rider progressively learns to ride the bicycle.

SUMMARY OF THE INVENTION

The present invention meets these needs. The dual mode training aid deploys both as a stage one training wheel and a stage two handle. The device attaches to the seat post of a bicycle, and can be easily removed after the learning process is over. A first position places a set of training wheels in contact with the ground. A second position raises one or both of the legs supporting the training wheels to a comfortable level above the ground for a non-rider trainer to provide support. A fixing device selectively places one or both of the legs into the second position. The device allows the rider to progress through the learning process without the necessity of utilizing different devices.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
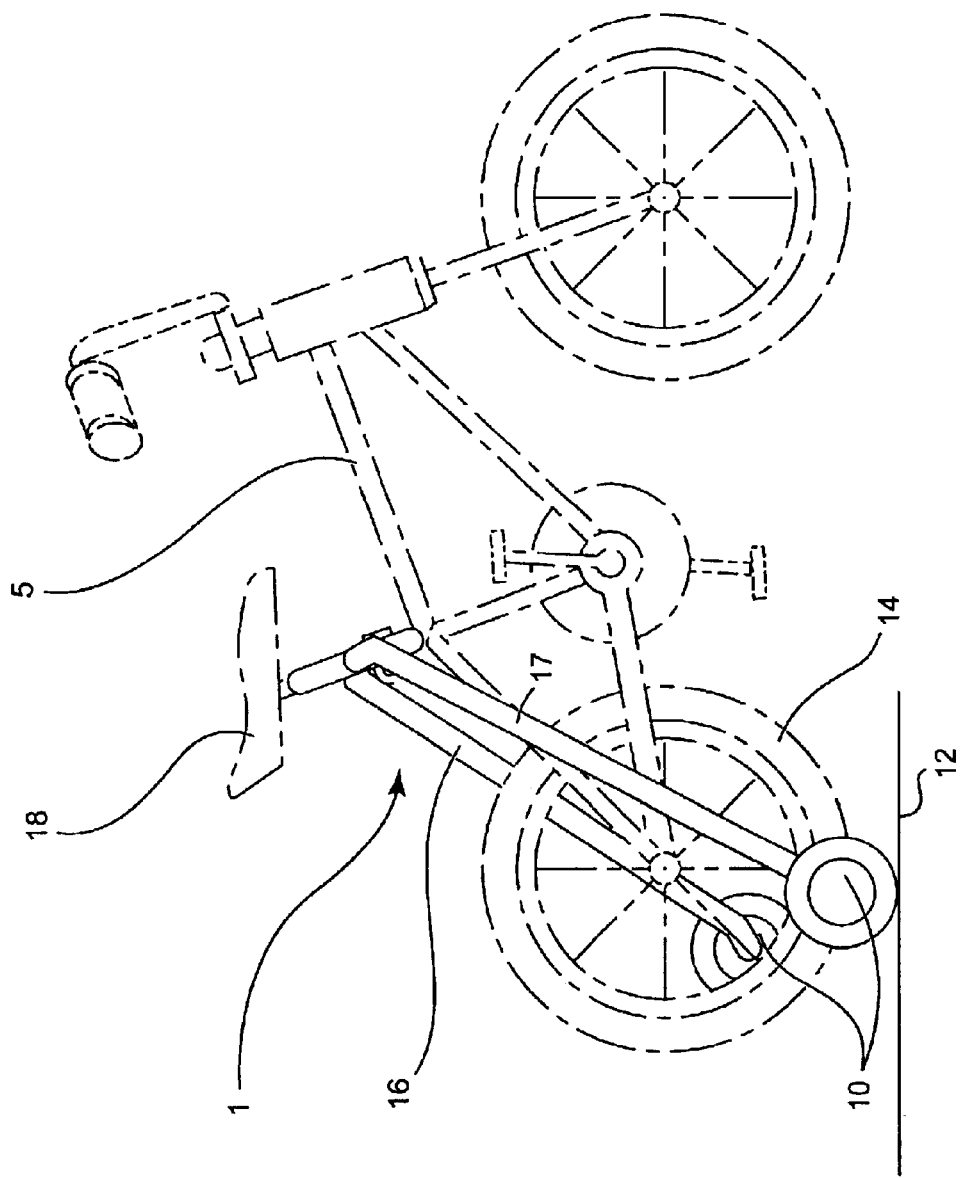
FIG. 1 illustrates the training aid in use in a first mode.

Referring to the accompanying drawings in which like reference numbers indicate like elements, FIG. 1 illustrates the training aid 1 attached to a bicycle 5. The invention is drawn only to the training aid 1 and not to the combination of the training aid 1 and the bicycle 5. The details of the bicycle 5 are provided to understand the environment in which the invention operates and to understand the function of the invention.

FIG. 1 shows the training aid 1 in a first mode. In the first mode, a first wheel and a second wheel 10 are placed in a down position such that the wheels contact a supportive surface 12. The supportive surface 12 is normally the ground but could be any surface. The wheels 10 provide support to a rider of the bicycle 5. The wheels 10 are arranged to either side of a rear wheel 14. At rest, the wheels 10 prevent the bicycle 5 from toppling, and in motion the wheels 10 continue to prevent toppling. As the weight of the rider shifts from side to side, the wheels 10 transmit a force from the support surface 12 to a first support member 16 or a second support member 17 and ultimately to the bicycle 5 in order to counteract the weight shift and thus stabilize the bicycle. This allows the rider to practice balancing on a seat 18 of the bicycle 5 with a reduced risk of falling.

Figure 2:
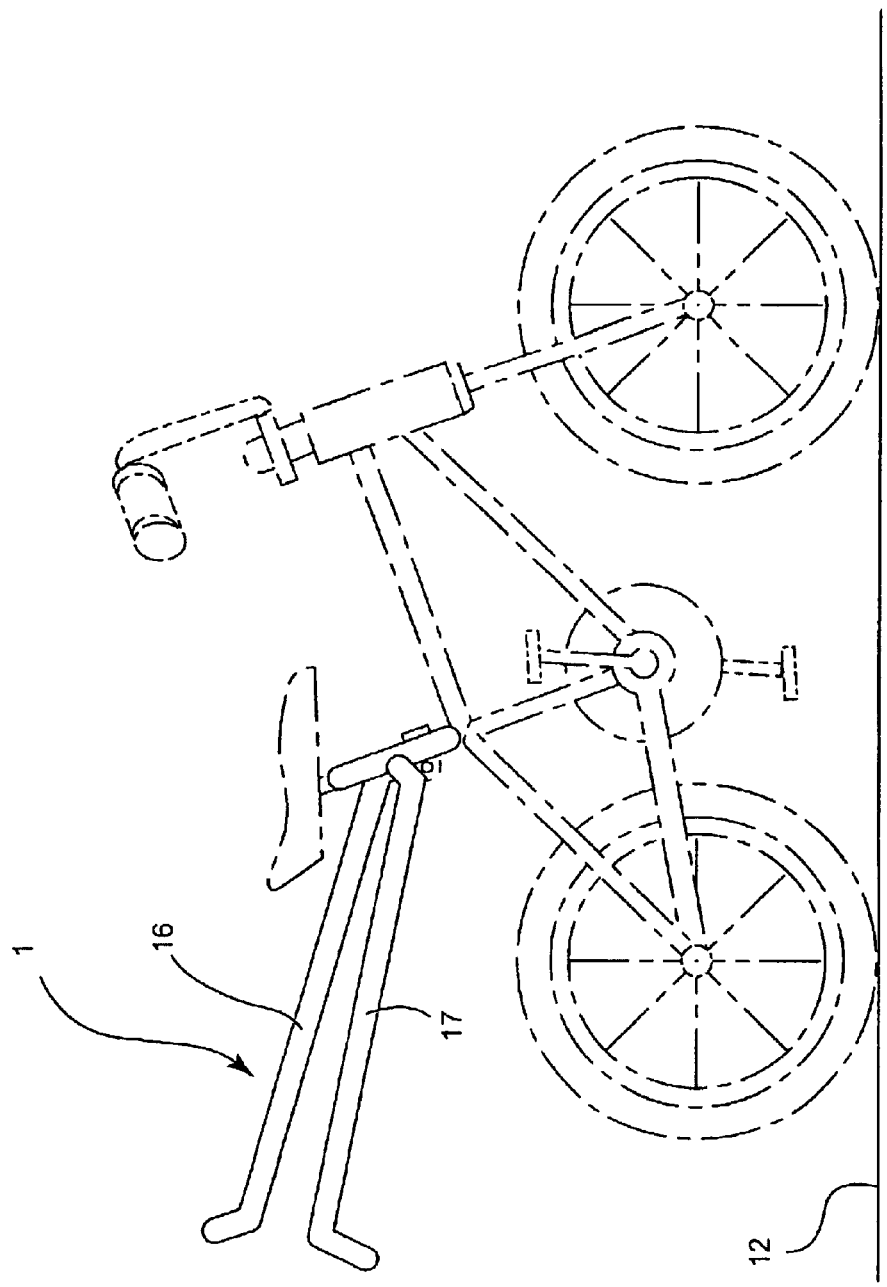
FIG. 2 illustrates the training aid in use in a second mode.

FIG. 2 shows the training aid 1 in a second mode. The wheels 10 have been removed and the first and second support members (16 and 17) placed in an up position. A non-rider trainer may provide support to the rider through first and/or second support members 16,17. The height above the support surface 12 adjusts as desired by the non-rider to a comfortable position. This eliminates the need for the non-rider to bend over to provide support to the bicycle and the rider.

Figure 3:
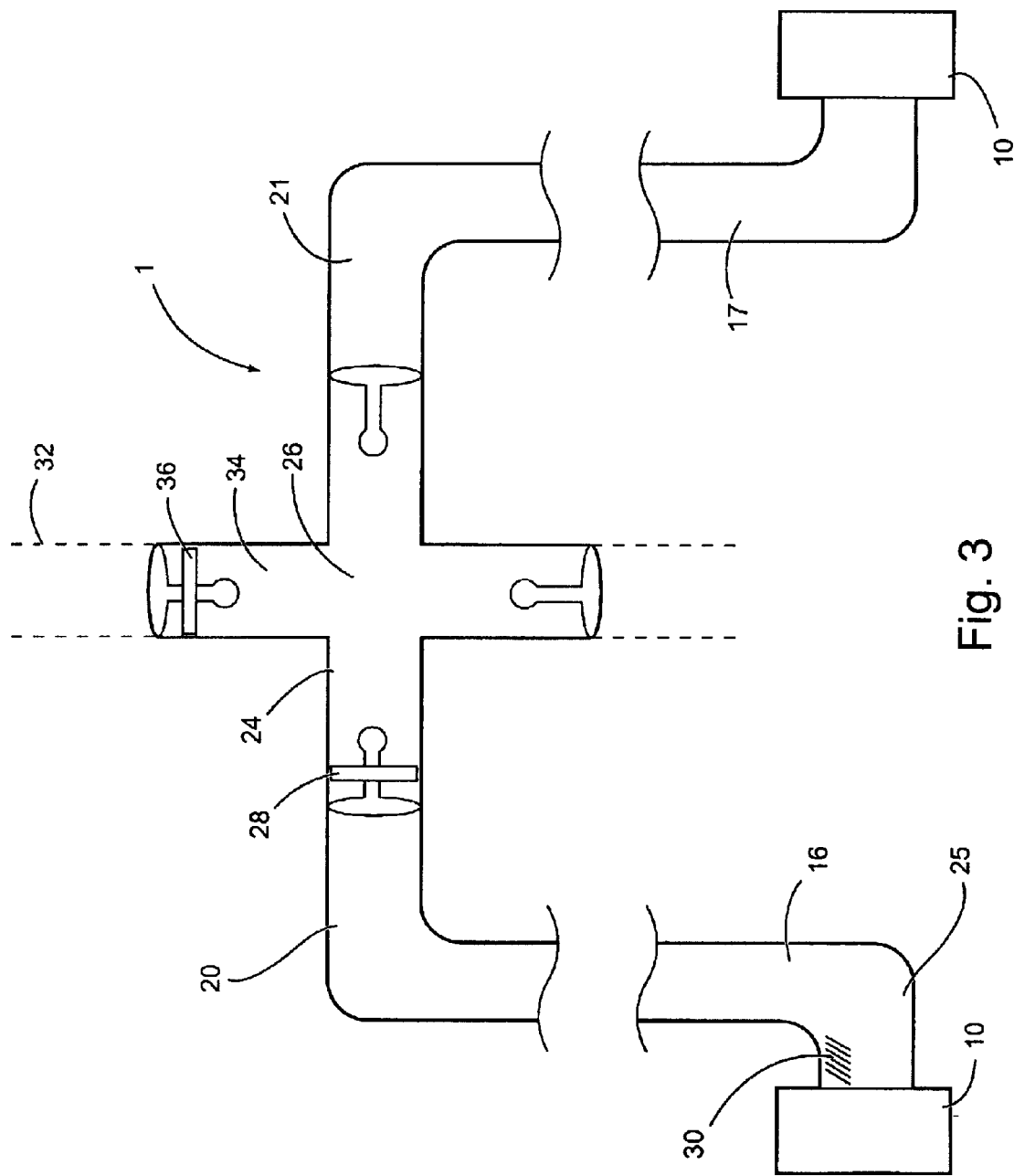
FIG. 3 illustrates the entire training aid.

FIG. 3 shows the first and second support members 16 and 17 and wheels 10 of the training aid 1. The training aid 1 is made of steel in the preferred embodiment, but could be made of any suitable material including but not limited to any suitable metal, such as aluminum, or any suitable polymer, such as plastic and PVC. The first support member 16 has a first bar portion 20 and a first leg segment. The second support member 17 has a second bar portion 21 and a second leg segment. The first and second bar portions 20 and 21 have a bar portion axis. A sleeve 24 of an attachment device 26 rotationally receives the first and second bar portions 20 and 21. A first tightening device 28 squeezes the sleeve 24 such that first bar portion 20 does not rotate. A second tightening device (not shown) squeezes the sleeve such that second bar portion 21 does not rotate. The first support member 16 transitions to a first projection 25 at an end of said leg segment opposite the first bar portion 20. A second projection is similarly located on the second support member 17. The first and second projections have a projection axis. In the preferred embodiment, the projection axis is parallel to bar portion axis. The wheels 10 are removably attached to the first and second projections at a location opposite said first and second leg segments. The first and second projections are sized to be able to accommodate the trainer's hand. In the preferred embodiment, a grip 30 is provided to the first and second projections to facilitate the interface between the non-rider and the training aid 1. In the alternative, the grip 30 can be located at the end of the leg segment adjacent the projection.

The attachment device 26 also may attach to a seat post 32 of the bicycle 5. The attachment device 26 provides a tube 34. The tube 34 slides over seat post 32. A fixing device 36 squeezes the tube 34 such that the tube 34 does not move with respect to the seat post 32.

Tube 34 and sleeve 24 of the attachment device 26 intersect in a "t" configuration (in the preferred embodiment). The tube 34 and sleeve 24 could also be arranged askew to one another. In both configurations, the first and second support members move independently.

Figure 4B:
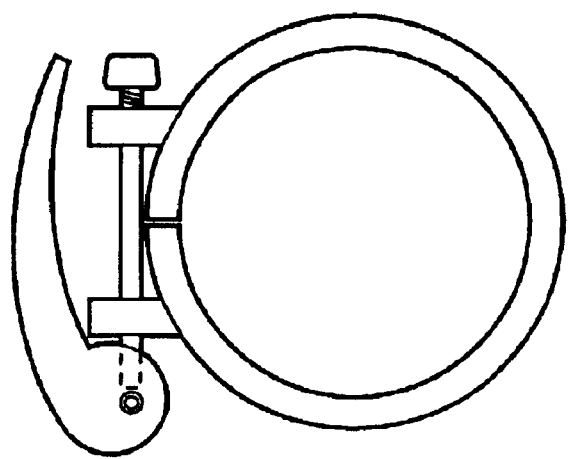
FIG. 4b illustrates the tightening device in a closed position.
Figure 4A:
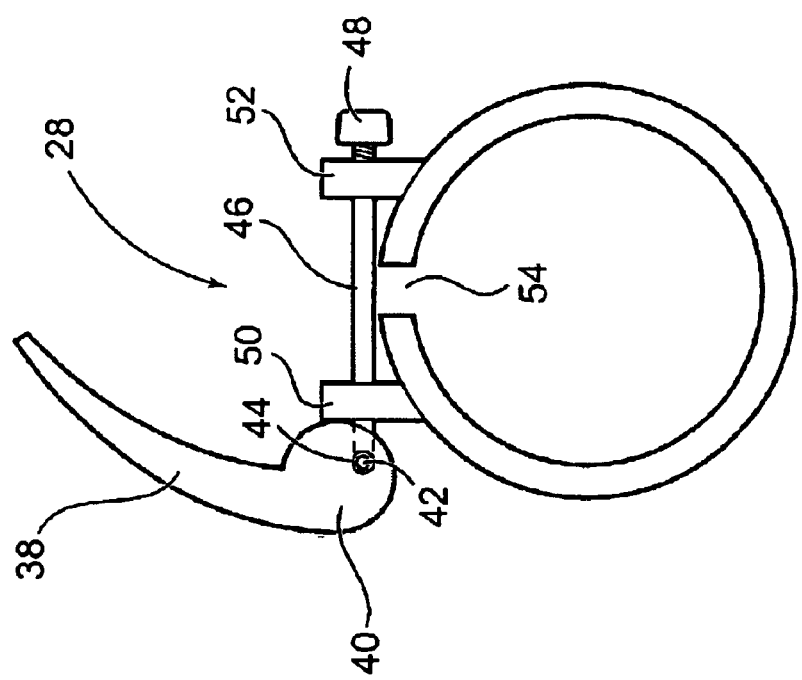
FIG. 4a illustrates the tightening device in an open position.

FIGS. 4a and 4b illustrate views of the first and second tightening devices 28. First and second tightening devices 28 have a handle 38 terminating in a head 40. Head 40 has a substantially circular shape and has a hole 44 offset from a center of the head 40. A pin 42 attaches a compression member 46 to the head 40. The compression member 46 terminates in a tail 48. First and second tightening devices 28 attach to the sleeve 24 at a first stop 50 and a second stop 52. First stop 50 and second stop 52 are located on opposite sides of a slot 54 in the sleeve. The head 40 of the tightening device 28 has a hole 44 offset from the center of the head 40 away from handle 38. As the handle 38 is arranged in an open position (FIG. 4a) to the compression member 46, the distance between the hole 44 and the first stop 50 is minimized. Rotation of handle 38 to a closed position (FIG. 4b) causes the distance between the hole 44 and the first stop 50 to become greater. This causes the compression member 46 to exert a force on the first stop 50 and the second stop 52 such that the slot 54 becomes narrower. This squeezes the sleeve 24 against the cross bar 20. The same type of fixing device affixes attachment device 26 to seat post 32, and affixes wheels 10 to grip 30. Tail 48 attaches to compression member 46 using interlocking threads (not shown). The preferred embodiment utilizes the tightening device described, although any type of tightening device could be used.

In use, training aid 1 attaches to a bicycle 5 by removing seat 18 of bicycle 5. Attachment device 26 then slides over seat post 32 after placing handle 38 of the fixing device 36 in an open position. Fixing device 36 closes in a closed position. First and second support members 16 then attach to the training aid 1. The tightening device 28, placed in an open position, allows first bar portion 20 to be placed into sleeve 24. After locating the wheels 10 in a desired position the tightening device 28 closes to a closed position.

For the first stage of the learning process, a first mode places the wheels 10 in a down position adjacent the supportive surface 12. The rider then develops the necessary balance to sit on bicycle 5 at rest and at slow speeds just as a rider would practice with a set of training wheels.

After becoming proficient with the skills learned in the first stage, the rider utilizes the training aid in a second mode. The first and second tightening devices 36 open to an open position and support members rotate up from the supportive surface 12. Placing the tightening device in a closed position affixes the bar portion 20 with respect to the attachment device 26, and places the first and second support members 16 and the grips 30 in a position providing a point of contact for the non-rider trainer to provide support and stability to the rider. This allows the rider to develop the balance necessary to operate the bicycle at faster speeds. In this mode the training aid functions as a support bar. As the rider progresses, the non-rider trainer gradually reduces the amount of support provided until the rider rides unassisted.

If desired, one support member 16 can be placed adjacent the supportive surface 12 and the other support member 16 can be placed in an up position. This is especially useful for a rider that consistently loses balance to a specific side or has trouble turning a specific direction.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the training aid 1 is designed to attach to the seat post 32 of a bicycle 5 but the training aid 1 can be attached to any point of the bicycle 5. Thus, the breadth and scope of the present invention should not be limited by any of the above-described exemplary embodiments, but should be defined only in accordance with the following claims appended hereto and their equivalents. Despite the illustrations of the bicycle, the invention is drawn to the training aid. The bicycle is recited in the claims to describe the working environment of the invention but should not be construed as an element or limitation of the invention. Thus, the training aid need not be attached (but may be attached) to the bicycle in order to be covered by the following claims.

What is claimed is:

1. A dual mode training aid for a bicycle, said dual mode training aid being mountable to a bicycle frame, deployable in a first mode and a second mode, and operable by a non-rider to guide and control the movement of the bicycle, said bicycle having a rear wheel operative on a supportive surface, the bicycle frame including a seat post and a seat for rider support, the dual mode training aid comprising:

an attachment adapted to attach to the seat post;

a fixing device located on said attachment for affixing said training aid to the bicycle;

a sleeve attached to said attachment;

a first support member having a first bar portion and a first leg segment, said first bar portion being rotationally received in said sleeve;

a second support member having a second bar portion and a second leg segment, said second bar portion being rotationally received in said sleeve;

a first tightening device located on said sleeve and operable to tighten said sleeve such that said first bar portion is rotationally fixed within said sleeve;

a second tightening device located on said sleeve and operable to tighten said sleeve such that said second bar portion is rotationally fixed within said sleeve;

a first projection extending from said first leg segment at an end of said first leg segment opposite said first bar portion;

a second projection extending from said second leg segment at an end opposite said second bar portion;

a first wheel attached to said first projection at a location opposite said first leg segment;

a second wheel attached to said second projection at a location opposite said second leg segment;

wherein in said first mode said first and second wheels are in a down position adjacent the supportive surface to provide stability and in said second mode said first and second projections are above the rear wheel to provide a point of contact for the non-rider to guide and control the movement of the bicycle.

2. The training aid of claim 1 wherein said wheels are removable.

3. The training aid of claim 1 further comprising a bar portion axis located in said first and second bar portions, a projection axis located in said first and second projections, wherein said bar portion axis is parallel to said projection axis.

4. The training aid of claim 1 further comprising a first grip located on said first projection and sized to accommodate the hand of the non-rider.

5. The training aid of claim 1 wherein each of said first and second tightening devices further comprises:

a handle;

a head located at an end of said handle;

a hole offset from a center of said head;

a pin secured in said hole;

a compression member attached to said pin;

a tail located on said compression member at an end opposite said pin;

a slot located on said sleeve;

a first stop engaged with said head and located on a side of said slot and a second stop engaged with said tail and located on a side opposite from said first stop;

wherein rotation of said handle exerts a force on said first stop and said second stop such that said slot is narrowed.

6. The training aid of claim 1 wherein said attachment is sized to encompass the seat post.

7. A method of learning to ride a bicycle using the training aid of claim 1, comprising the steps of:

attaching the training aid to the bicycle;

placing the training aid in a down position corresponding to said first mode;

learning basic balance skills;

placing the training aid in an up position corresponding to said second mode;

learning advance balance skills while being supported by a non-rider.

8. A dual mode training aid for a bicycle, said dual mode training aid being mountable to a bicycle frame, deployable in a first mode and a second mode, and operable by a non-rider trainer to guide and control the movement of the bicycle, said bicycle having a rear wheel operative on a supportive surface, the bicycle frame including a seat post and a seat for rider support, the dual mode training aid comprising:

an attachment adapted to attach to the seat post;

a fixing device located on said attachment for affixing said training aid to the bicycle;

a sleeve attached to said attachment;

a first support member having a first bar portion being rotationally received in said sleeve;

a second support member having a second bar portion being rotationally received in said sleeve;

a first wheel attached to said first support member;

a second wheel attached to laid second support member;

a first tightening device located on said sleeve and operable to tighten said sleeve such that said first bar portion is rotationally fixed within said sleeve;

a second tightening device located on said sleeve and operable to tighten said sleeve such that said second bar portion is rotatingally fixed within said sleeve; and wherein in said first mode said first and second wheels are in a down position adjacent the supportive surface to provide stability and in said second mode said first and second support members are above the rear wheel to provide a point of contact for the non-rider trainer to guide and control the movement of the bicycle.

9. The dual mode training aid of claim 8 further comprising a first projection extending from said first support member at an end opposite said first bar portion; and a second projection extending from said second support member at an end opposite said second bar portion.

10. The dual mode training aid of claim 9 wherein said first wheel is attached to said first projection and said second wheel is attached to said second projection.

11. The dual mode training aid of claim 10 wherein said wheels are removable.

12. The dual mode training aid of claim 10 further comprising a bar portion axis located in said first and second bar portions, a projection axis located in said first and second projections, wherein said bar portion axis is parallel to said projection axis.

13. The dual mode training aid of claim 10 further comprising a first grip located on said first projection and sized to accommodate the hand of the non-rider.

14. The dual training 10 wherein each of said first and second tightening devices further comprises a handle;

a head located at an end of said handle;

a hole offset from a center of said head;

a pin secured in said hole;

a compression member attached to said pin;

a tail located on said compression member at an end opposite said pin;

a slot located on said sleeve;

a first stop engaged with said head and located on a side of said slot;

a second stop engaged with said tail and located on a side opposite from said first stop; wherein rotation of said handle exerts a force on said first stop and said second stop such that said slot is narrowed.

15. The dual mode training aid of claim 10 wherein said attachment is sized to encompass the seat post.

16. A method of learning to ride a bicycle using the dual mode training aid of claim 10, comprising the steps of:

attaching the training aid to the bicycle;

placing the training aid in a down position corresponding to said first mode;

learning basic balance skills;

placing the training aid in an up position corresponding to said second mode;

learning advance balance skills while being supported by a non-rider.

17. A dual mole training aid for a bicycle, said dual mode training aid being mountable to a bicycle frame, deployable in a first mode and a second mode, and operable by a non-rider trainer to guide and control the movement of the bicycle, said bicycle having a rear wheel operative on a supportive surface, the bicycle frame including a seat post and a seat for rider support, the dual mode training aid comprising:

an attachment adapted to attach to the bicycle;

a fixing device located on said attachment for affixing said training aid to the bicycle;

a sleeve attached to said attachment;

a first support member having a first bar portion and a first leg segment the first bar portion being rotationally received in said sleeve;

a second support member having a second bar portion and a second leg segment, the second bar portion being rotationally received in said sleeve;

a plurality of wheels;

a first tightening device located on said sleeve and operable to tighten said sleeve such that said first bar portion is rotationally fixed within said sleeve;

a second tightening device located on said sleeve and operable to tighten said sleeve such that said second bar portion is rotationally fixed within said sleeve;

wherein in said first mode said wheels are in a down position adjacent the supportive surface to provide stability and in said second mode at least one of said first and second support members is above the rear wheel to provide a point of contact for the non-rider trainer to guide and control the movement of the bicycle.

18. A method of learning to ride a bicycle using the training aid of claim 17, comprising the steps of:

attaching the training aid to the bicycle;

placing the training aid in a down position corresponding to said first mode;

learning basic balance skills;

placing the training aid in an up position corresponding to said second mode;

learning advance balance skills while being supported by a non-rider.

\* \* \* \* \*

UNITED STATES PATENT AND TRADEMARK OFFICE
CERTIFICATE OF CORRECTION

PATENT NO. : 6,769,708 B2
DATED : August 3, 2004
INVENTOR(S) : Jack Ackerly

It is certified that error appears in the above-identified patent and that said Letters Patent is hereby corrected as shown below:

Column 6,
Line 6, should read: -- A method of learning to ride bicycle using the training --

Column 7,
Line 34, should read:
17 A dual mode training aid for a bicycle, said dual mode Signed and Sealed this Eighth Day of February, 2005

JON W. DUDAS
*Director of the United States Patent and Trademark Office*